Nov. 20, 1945.  S. J. MIKINA  2,389,382

REGULATING SYSTEM

Filed March 21, 1944

INVENTOR
Stanley J. Mikina.
BY
James N. Ely
ATTORNEY

Patented Nov. 20, 1945

2,389,382

UNITED STATES PATENT OFFICE 2,389,382

REGULATING SYSTEM

Stanley J. Mikina, Wilkinsburg, Pa., assignor to Westinghouse Electric Corporation, East Pittsburgh, Pa., a corporation of Pennsylvania Application March 21, 1944, Serial No. 527,450

12 Claims. (Cl. 172—239)

This invention relates, in general, to regulating systems and, in particular, to position and tension regulating systems.

An object of this invention is to provide a regulating system for controlling the direction and speed of operation of a motor.

Another object of this invention is to provide in a regulating system for controlling the direction and speed of operation of a motor for effecting a velocity response to compensate for time delays inherent in the regulated system.

Figure 1:
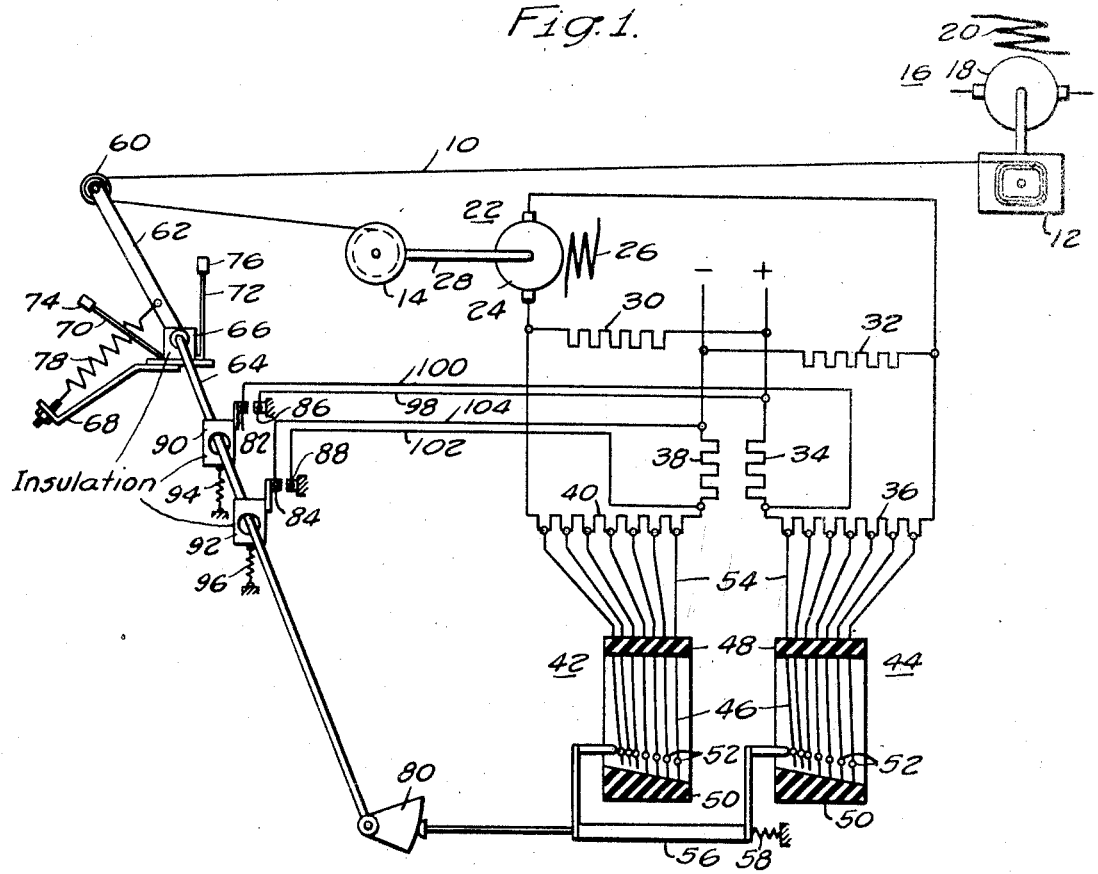
Figure 2:
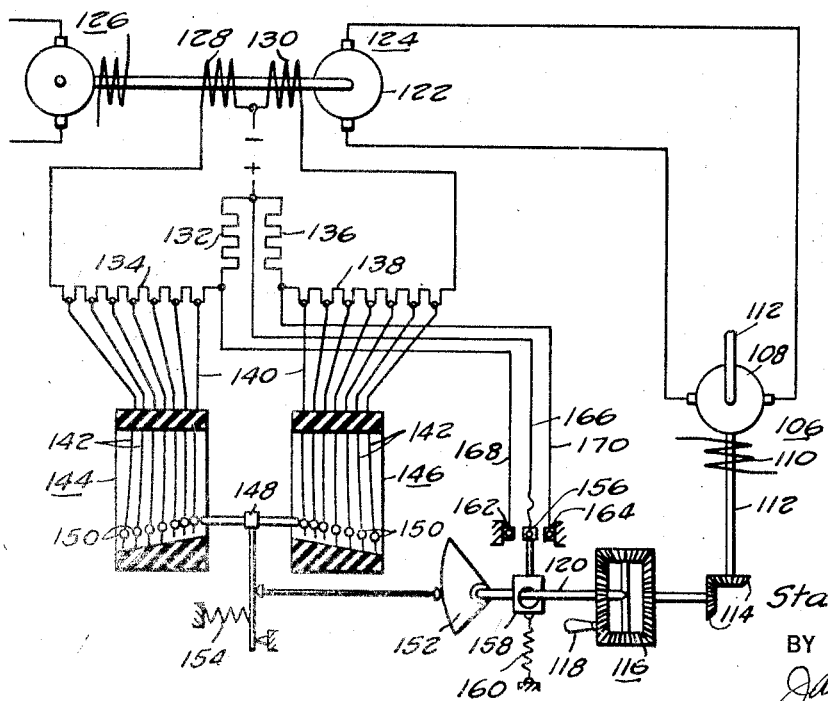

Other objects of this invention will become apparent from the following description when taken in conjunction with the accompanying drawing in which Figure 1 is a diagrammatic illustration of the apparatus and circuits embodying the teachings of this invention as applied to a tension regulator, and Fig. 2 is a diagrammatic illustration of the apparatus and circuits embodying the teachings of this invention as applied to a position regulator.

Referring to Fig. 1 of the drawing, this invention is illustrated by reference to the winding of a wire 10 on an irregularly-shaped mandrel 12 from a supply reel 14. The mandrel 12 illustrated is of rectangular shape such as is employed in industry for the winding of coils for transformers or the like, and is disposed to be driven at a predetermined speed by any suitable motor 16. The motor 16 comprises an armature winding 18 and a field winding 20 which are connected to suitable sources of supply (not shown).

As illustrated, a direct current reversible motor 22 is provided for cooperating in controlling the speed of the supply reel 14 and the tension of the wire 10 between the reel 14 and the mandrel 12. The motor 22 comprises an armature winding 24 and a field winding 26, the field winding being separately excited from any suitable source of power (not shown). The supply reel 14 is carried on the armature shaft 28 and is, therefore, responsive to the speed and direction of operation of the motor 22.

In order to control the speed and direction of operation of the motor 22, the armature winding 18 is connected to a suitable source of direct current as represented by the positive and negative signs through a resistor bridge circuit. As illustrated, one leg of the resistor bridge circuit comprises resistors 30 and 32 connected between the positive terminal of the direct-current source and the armature 18 and the negative terminal of the direct-current source and the armature 18, respectively. The other leg of the resistor bridge circuit comprises a fixed resistor 34 and an adjustable resistor 36 connected between the positive terminal of the direct-current source and the armature 18 and a fixed resistor 38 and an adjustable resistor 40 connected between the negative terminal of the direct-current source and the armature 18, respectively.

In order to adjust the resistors 36 and 40 to control the number and sections thereof which are connected in series circuit relation with the armature 16 and thereby control the direction of the flow of direct current through the armature, a pair of primary control devices 42 and 44 is provided and disposed to be operated in a predetermined manner. Each of the primary control devices 42 and 44 is formed of a plurality of elongated conducting leaf spring members 46 having one end of each member secured in fixed spaced relation to each other and extending through suitable insulating means such as the block 48, so that their free ends are self-biased against a sloped stop 50 of insulating material. The contact members 52 carried on the free ends will be in spaced relation to each other when the free ends of the conducting members seat against the sloped stop 50. Each of the fixed ends of the stacks of conducting members is so connected by a conductor 54 to a different tap of the resistors 36 and 40 that the conducting members of control devices 42 and 44, respectively are progressively connected to progressive taps of the respective resistors. An insulating driving member 56 is disposed to be actuated under predetermined conditions to effect a simultaneous progressive actuation of the conducting members of control devices 42 and 44 away from the sloped stops to simultaneously shunt the resistor sections of resistors 36 and 40 in a progressive manner. The driving member 56 may be mounted in any suitable manner and is normally biased away from the conducting members 46 as by the spring 58. The primary control devices 42 and 44 referred to hereinbefore are disclosed and claimed in Patent No. 2,246,301, issued June 17, 1941, to C. R. Hanna et al. which is assigned to the assignee of this invention.

The driving member 56 of the primary control devices 42 and 44 is disposed to be actuated in accordance with the tension of the wire 10 between the supply reel 14 and the winding mandrel 12. As illustrated, the wire 10 is supplied the mandrel 12 by passing the wire over an idler pulley 60 which is carried in a substantially nonfriction manner at the end of an arm 62 which is mounted for pivotal movement. The other end of the arm 62 is fixedly mounted on a shaft 64 which extends between and through suitable brackets 66, only one of which is shown, the shaft 64 being disposed to be rotated therein. The brackets 66 are mounted on a base plate which carries arms 68, 70 and 72 thereon, the arms 70 and 72 being provided with stop members 74 and 76, respectively, for limiting the extent of movement of the arm 62 whereas the arm 68 serves as the anchor point for spring 78 which restrains the clockwise movement of the arm 62. In order to operate or move the driving member 56 against the bias of spring 58, a cam 80 is carried on the rotatable shaft 64 disposed to engage the end of the driving member 56.

As illustrated, two frictionally actuated switch members 82 and 84 are disposed for operation by the rotation of shaft 64 into and out of engagement with the cooperating stationary contact members 86 and 88, respectively. The switch members 82 and 84 are carried by insulating blocks 90 and 92, respectively, each of which is provided with a central opening therein through which the rotatable shaft 64 projects. The central openings of the blocks 90 and 92 are large compared with the diameter of the rotatable shaft 64, the blocks 90 and 92 being biased into frictional engagement with the shaft 64 by springs 94 and 96, respectively. The stationary contact member 86 is connected by conductor 98 to the lead between the positive terminal of the direct-current source and one end of the fixed resistor 34 while its cooperating movable contact member 82 is connected by conductor 100 to the other end of fixed resistor 34. The stationary contact member 88 is connected by conductor 102 to one end of fixed resistor 38 and its cooperating movable contact member 84 is connected by conductor 104 to the lead between the negative terminal of the source of direct current and the other end of resistor 38. Thus when the contact members 82 and 84 are actuated to a circuit closing position, the fixed resistors 34 and 38 are shunted from the armature circuit to give a reduced resistance path for the current from the direct-current source.

The blocks 90 and 92 and the springs 94 and 96 are so selected that for a clockwise movement of the shaft 64, the contact members 82 and 84 are actuated into circuit closing position and are maintained in that position so long as the direction of rotation of the shaft 64 is unchanged, the blocks slipping on the shaft 64 without damage thereto. In practice if the rotation of the shaft 64 should become reversed as will be explained more fully hereinafter, the contact members 82 and 84 are actuated to a circuit opening position. In general practice the contact members 82 and 84 are actuated to give, in effect, a vibratory switching operation with their cooperating stationary contact members 86 and 88.

In operation, assuming that the wire 10 has been threaded over the idler pulley 60 to the mandrel 12, the arm 62 is normally seated against the stop 74 until the motors 16 and 22 are energized. With the arm 62 in this position the conducting members 46 of primary control devices 42 and 44 are seated against their cooperating sloped stops 50 and all of resistors 40 and 36 are connected in series circuit with the armature winding 24 of motor 22. Thus when motors 16 and 22 are initially energized, the motor 16 tends to wind the wire 10 on the mandrel 12 whereas the motor 22 tends to wind the wire 10 on the reel 14. The latter operation of motor 22 is evident since with all of resistors 40, 38, 34 and 36 connected in circuit with the armature winding 24, the current flow through the armature is through the low resistance leg of the bridge circuit and may be traced from the positive terminal of the direct-current source through resistor 30, armature winding 24 and resistor 32 to the negative terminal of the direct-current source to effect the operation of the motor 22 and the reel 14 in a clockwise direction to tend to wind the wire 10 thereon.

Since the mandrel 12 and reel 14 are operating in opposition, the tension applied to the wire 10 is increased to effect a rotation of the arm 62 and shaft 64 in a clockwise direction to operate the cam 80 in a direction to actuate the driving member 56 to effect the gradual and progressive movement of the conducting members 46 away from the sloped stops 50 until a sufficient number of sections of resistors 40 and 36 are shunted and the leg of the bridge circuit containing resistors 34, 36, 38 and 40 has less resistance than the leg containing resistors 30 and 32. When this happens the current flow through the armature winding is reversed to effect the operation of the motor 22 and the reel 14 in a counterclockwise direction.

The speed of the reel 14 is controlled to maintain substantially constant tension on the wire 10, any variations therein being reflected by a movement of the arm 62 and a corresponding movement of the cam 80 to effect an adjustment in the number of sections of resistors 40 and 36 which are shunted from the armature circuit and thereby control the speed of unwinding from the reel 14 or the reversal of the motor 22 to tend to wind the wire 10 on the reel.

For ideal operating conditions, the arm 62 is in the position illustrated intermediate the stops 74 and 76. However, as will be appreciated, there will be constant movement of the arm 62 in one or the other directions away from the intermediate position for as the mandrel 12 is turned, the irregular shape of the mandrel effects a constant change in the wire velocity. Further if for any reason the wire on the mandrel 12 should become tangled, it is necessary to change the operation of the reel 14 from an unwinding operation to one tending to wind the wire thereon in order to maintain the tension and prevent further entanglement of the wire 10.

The circuits and apparatus discussed hereinbefore are satisfactory for tending to maintain the tension on the wire, being responsive to the positioning of the arm 62 as it varies with changes in the tension. However, the operation of the system responsive to the positioning of the arm 62 has an inherent time delay in effecting the required changes in the armature current, and the contact members 82 and 84 are, therefore, utilized for making a correction in the armature current in response to the velocity change or change in direction in positioning the arm 62 to anticipate the gradual corrective operation of the position responsive apparatus and circuits.

For example, as the tension on the wire 10 increases as described, the movement of the cam 80 and the operation of primary control devices 42 and 44 introduces an inherent time delay in effecting the change in the speed of the motor 22. However, the increase in the tension effects a rotation of the shaft 64 in the clockwise direction and the contact members 82 and 84 carried by the blocks 90 and 92, respectively, which are in frictional engagement with the shaft 64, are immediately actuated to their circuit closing position to immediately shunt resistors 34 and 38 from the armature circuit to increase the current flowing through armature winding 24.

With the contact members 82 and 84 in their circuit closing positions, current flows from the positive terminal of the direct-current source through conductor 98, contact members 86 and 82, conductor 100, the first lead 54 and the closed contact members 52 of primary control device 44, the unshunted part of resistor 36, armature winding 24, the first lead 54 and the closed contact members 52 of primary control device 42, the unshunted part of resistor 40, conductor 102, contact members 88 and 84 and conductor 104 to the negative terminal of the direct-current source. By thus immediately shunting resistors 34 and 38, the armature current is so increased as to increase the speed of unwinding of reel 14.

The contact members 82 and 84 are maintained in their circuit closing position as long as the direction of rotation of shaft 64 is unchanged to effect a change in the speed of the motor in anticipation of the change which the cam 80 and primary control devices 42 and 44 will effect. As soon as the rotation of shaft 64 is stopped or the direction of rotation is reversed, contact members 82 and 84 are actuated to their circuit opening positions and the control of the speed and direction of operation of the motor 22 is obtained through the cam 80 and the primary control devices 42 and 44. In practice, the position of arm 62 is changing at all times so that the contact members 82 and 84 vibrate into and out of circuit closing position depending upon the direction of change of rotation of the shaft 64, and by cooperating with the position responsive cam 80 and primary control control devices 42 and 44, a very close control of the tension of the wire 10 is obtained.

From the foregoing description of the operation of the regulating system, it is evident that variations in the motor current due to the action of the frictionally operated contact members 82 and 84 are such as to produce variations in the motor torque that oppose changes in the velocity of the motor 22 and associated reel 14 thus giving a damping effect similar to that produced by a brake disposed to alternately engage and disengage the armature shaft 28. The change in motor torque due to the action of the frictionally operating contact members 82 and 84 in alternately connecting and shunting fixed resistors 34 and 38, respectively, from the armature circuit is a fixed value independent of the motor velocity or idler pulley shaft velocity since the contact members 82 and 84 are moved immediately into and out of engagement with their cooperating fixed contact members 86 and 88, respectively, depending upon the direction of the velocity change of the pulley shaft 64. This non-linear velocity response is analogous to the rate of change response in a linear system and thus serves approximately to compensate for time delays in the regulating system. In a regulating system responsive to changes in position such as that described, the effect of time delays between the appearance of an error and a subsequent change in motor torque to correct this error is to cause the change in corrective motor torque to have a component in phase or in the direction with the motor velocity, thus tending to excite and maintain hunting oscillations of the system. It is thus seen that the frictionally operated contact members 82 and 84 effect a change in the corrective motor torque that has a component out-of-phase or opposing the direction of the motor velocity thus compensating for the in-phase component due to the system time delays. The cooperating apparatus and circuits of the system described effectively maintains a substantially constant tension on the wire 10 and eliminates hunting oscillations in the regulated system.

In the embodiment of this invention illustrated in Fig. 2 the speed and direction of operation of a positioning motor 106 is so controlled that it operates to position an object such as a gun (not shown) in response to a reference position. The motor 106 comprises an armature winding 108 and a separately excited field winding 110, an armature shaft 112 being provided for carrying the object to be positioned and for connecting the motor through the gears 114 and a differential 116 to a reference position. In this instance the reference position is manually controlled as represented by the handle 118 shown on the differential. By connecting the motor 106 to one side of the differential and the manual control 118 to the other side of the control, the output shaft 120 of the differential moves in accordance with the difference in speed and direction of operation of the motor 106 and the reference object 118.

The motor 106 has its armature winding 108 connected across the armature winding 122 of a generator 124 which is driven by a motor 126. The generator 124 is provided with two field windings 128 and 130 connected differential for controlling the output of the generator and consequently the speed and direction of the positioning motor 106. As illustrated, each of the field windings 128 and 130 is connected across a direct-current source represented by the positive and negative signs, a fixed resistor 132 and an adjustable resistor 134 being disposed to be connected in circuit with field winding 128 and a fixed resistor 136 and an adjustable resistor 138 being disposed to be connected in circuit with the field winding 130.

The adjustable resistors 134 and 138 are formed of a plurality of sections, the taps of which are connected by leads 140 to the fixed ends of conducting leaf spring members 142 of primary control devices 144 and 146, respectively. The primary control devices 144 and 146 are identical to primary control devices 42 and 44 employed in the embodiment of Fig. 1 but in the embodiment of Fig. 2, the primary control devices are disposed in opposition and are provided with a common driving member 148. The driving member 148 is so disposed between the primary control devices 144 and 146 that for a balanced condition an equal number of conducting members 142 of each of the primary control devices are actuated to circuit closing positions and as the driving member 148 is actuated to close more of the conducting members 142 of one of the primary control devices a simultaneous release or opening of an equal number of the contact members 150 of the other primary control device is obtained. The driving member 148 is actuated by the cam 152 carried on the end of the rotatable shaft 120 against the bias of spring member 154.

As in the embodiment of Fig. 1, the system of Fig. 2 also utilizes a switch responsive to the direction of rotation of the rotatable shaft, a movable contact member 156 being carried by the block 158 positioned on and maintained in frictional engagement with the shaft 120 by the spring 160 for vibratory engagement with a pair of oppositely disposed contact members 162 and 164. The movable contact member 156 is connected by conductor 166 to the positive terminal between the ends of resistors 132 and 136 whereas the contact members 162 and 164 are connected by conductors 168 and 170, respectively, to the other ends of resistors 132 and 136, respectively.

In operation, assuming that the object (not shown) carried by the shaft 112 is in a position corresponding to the reference position as represented by the handle 118 the regulating system is in substantial balance as illustrated. Under these conditions, although the generator 124 is driven by the motor 126, since the current flowing in the opposed generator field windings 128 and 130 is balanced by reason of equal values of resistance being maintained in the field circuits, the field excitation and output of the generator 124 is zero and the motor 106 remains stationary.

If the reference object 118 is moved, as by turning it counterclockwise with respect to the shaft 120, the shaft 120 is immediately rotated, the rotation being the differential between the reference object movement and the rotation of the motor shaft 112 as imparted to the differential 116 through the gears 114 to effect a movement of the cam 152 counterclockwise with reference to the shaft 120 whereby the bias of the spring 154 forces the driver member 148 is a direction to progressively release the conducting members of primary control device 144 and to progressively drive more of the conducting members of primary control device 146 into engagement thereby increasing the resistance in circuit with the field winding 128 and decreasing the resistance in circuit with the field winding 130. Forgetting for the time being the effect of the friction operated contact member 156, it is seen that the change in the resistance by reason of the operation of primary control devices 144 and 146 increases the current flowing in field winding 130 to cause the generator 124 to supply current to the armature 108 of motor 106 to cause it to drive the object (not shown) carried by the armature shaft 112 to a position corresponding to the position of the reference object 118. As the motor 106 is operated, the shaft 120 responds to the differential of movement between the motor shaft 112 and the now stationary reference object 118 to reverse its direction of rotation to actuate the cam 152 in the opposite direction to operate the driving member 148 to release the conducting members of primary control device 146 and move those of device 144 to circuit closing position to progressively decrease the excitation of generator 124 and consequently the speed of motor 106 until the field windings 128 and 130 are again balanced and the motor 106 is stopped.

As the reference object 118 is moved and the shaft 120 is rotated, the movable contact member 156 is actuated into engagement with contact member 162 or 164 depending upon the direction of rotation of the shaft 120. If the movement is as described hereinbefore in a counterclockwise direction about the shaft 120, then the contact member 156 is carried into engagement with contact member 164 to immediately shunt the resistor 136 from circuit with the field winding 130 and thereby effect an immediate increase in the excitation of the generator 124 to effect an accelerated operation of the motor 106. Contact member 156 remains in its circuit closing position with contact member 164 as long as the shaft 120 is rotated or until the direction of rotation of shaft 120 is reversed, to give an accelerated operation of the motor 106 in anticipation of the gradual correction obtained by operation of the primary control device 146.

It will be appreciated that if the movement of the reference object 118 is in a clockwise direction with reference to the shaft 120 that primary control device 144 will operate to shunt progressive sections of resistor 134 and primary control device 146 will function to add sections of resistor 138 to the respective field circuits of field windings 128 and 130, respectively, to so change the output of generator 124 as to reverse the current flowing through the armature 108 of motor 106 to move the object (not shown) to a position complementary to that of the reference object 118. Simultaneously therewith, the contact member 156 is actuated to engage contact member 162 and thereby immediately shunt resistor 132 from circuit with the field winding 128 to accelerate the operation of the motor 106. As in the previous case, the contact member 156 is maintained in engagement with contact member 162 as long as the shaft 120 is rotated or until the direction of rotation of shaft 120 is changed.

In both of the embodiments described hereinbefore the regulating systems are sensitive to changes giving a sensitive control of the operation of the driving motor. By utilizing the velocity responsive frictionally actuated switches to give a nonlinear velocity response, a superior regulating system is obtained since such velocity or direction responsive control effectively compensates for time delays inherent in the position regulating system.

While this invention has been described with reference to specific embodiments, it is of course not to be limited thereto except insofar as is necessitated by the scope of the appended claims.

I claim as my invention:

1. In a regulating system, in combination, a motor to be controlled, a direct-current source for operating the motor connected across the motor armature, a plurality of circuits connected to the direct-current source for controlling the operation of the motor, means provided in each of the circuits connected to the direct-current source for controlling the flow of current in the circuits to effect a reversal of the motor armature, and means connected to the motor responsive to operating conditions for effecting the operation of the controlling means for controlling the direction of flow of current through the armature.

2. In a regulating system, in combination, a motor to be controlled, a direct-current source disposed to be connected across the motor armature, a plurality of resistor circuits connected between the direct-current source and the motor armature, certain of the resistors of at least one of the resistor circuits being adjustable, means disposed for adjusting the adjustable resistors in a predetermined manner for controlling the flow of current in the plurality of resistor circuits to effect a reversal of the motor armature, and means connected to the motor responsive to operating conditions for effecting the operation of the adjusting means for controlling the direction of flow of current through the armature.

3. In a regulating system, in combination, a motor to be controlled, a direct-current source for operating the motor connected across the motor armature, a plurality of circuits connected to the direct-current source for controlling the operation of the motor, means provided in each of the circuits connected to the direct-current source for controlling the flow of current in the circuits to effect a reversal of the motor armature, a member disposed for rotational operation in response to operating conditions of the motor, means responsive to movement of the rotatable member for effecting the gradual operation of the controlling means for controlling the direction and amount of current flowing through the motor armature, and means responsive to directional movement of the rotatable member disposed for simultaneous operation with the gradual operating means for effecting quick initial changes in the direction of flow of current through the motor armature.

4. In a regulating system, in combination, a motor to be controlled, a direct-current source disposed to be connected across the motor armature, a plurality of resistor circuits connected between the direct-current source and the motor armature, certain of the resistors of at least one of the resistor circuits being adjustable, means disposed for adjusting the adjustable resistors in a predetermined manner for controlling the flow of current in a plurality of resistor circuits to effect a reversal of the motor armature, a member disposed for rotational movement in response to operating conditions of the motor, means responsive to positional movement of the rotatable member for effecting the gradual operation of the adjusting means for controlling the direction of flow of current through the motor armature, and means responsive to directional movement of the rotatable member disposed for simultaneous operation with the gradual operating means for effecting quick initial changes in the direction of flow of current through the motor armature.

5. In a regulating system, in combination, a motor to be controlled, a direct-current source disposed to be connected across the motor armature, a resistor bridge circuit having adjustable resistors in one of the legs thereof connected between the direct-current source and the motor armature, switching apparatus disposed for adjusting the adjustable resistors for controlling the flow of current in the bridge circuit to effect a reversal of the motor armature, a member disposed for rotational movement in response to operating conditions of the motor, means responsive to positional movement of the rotatable member for effecting the operation of the switching apparatus for controlling the direction of flow of current through the motor armature, and means responsive to directional movement of the rotatable member disposed for simultaneous operation with the operating means for the switching apparatus for effecting quick initial changes in the bridge circuit and the direction of flow of current through the motor armature.

6. In a regulating system, in combination, a motor to be controlled, a direct-current source disposed to be connected across the motor armature, a resistor bridge circuit having adjustable resistors in one of the legs thereof connected between the direct-current source and the motor armature, switching apparatus disposed for adjusting the adjustable resistors for controlling the flow of current in the bridge circuit to effect a reversal of the motor armature, a member disposed for rotational movement in response to operating conditions of the motor, means responsive to positional movement of the rotatable member for effecting the operation of the switching apparatus for controlling the direction of flow of current through the motor armature, and means comprising a frictionally actuated switch responsive to directional movement of the rotatable member disposed for simultaneous operation with the operating means for the switching apparatus for effecting quick initial changes in the bridge circuit and the direction of flow of current through the motor armature, the frictionally actuated switch being disposed to maintain the initial changes in the bridge circuit until the directional movement is stopped.

7. In a regulating system, in combination, a motor to be controlled, a generator having an armature disposed to supply current to the motor armature, a pair of opposed field windings for the generator, a source of direct current disposed to be connected to the field windings, a pair of resistor circuits each of which is connected between the direct-current source and one of the field windings, a switching apparatus associated with each of the resistor circuits, a member disposed for rotational movement in response to operating conditions of the motor, means responsive to positional movement of the rotatable member for effecting the inverse operation of the switching apparatus for controlling the excitation of the generator, and means responsive to directional movement of the rotatable member disposed for effecting quick initial changes in the resistor circuits to effect quick initial changes in the excitation of the generator, the quick change means being disposed to maintain the initial changes in the field circuits until the directional movement is stopped.

8. In a regulating system, in combination, a motor to be controlled, a direct-current source for supplying the motor, a plurality of circuits connected in circuit relation with the direct-current source for controlling the operation of the motor, means provided in each of the plurality of circuits for controlling the flow of current therein to effect a reversal of the motor, means connected to the motor responsive to operating conditions for effecting the operation of the controlling means, and means operative under predetermined conditions simultaneously with the controlling means for effecting a quick initial change in the flow of current in said plurality of circuits for quickly initiating a change in the operation of the motor.

9. In a regulating system, in combination, a motor the speed and direction of operation of which is to be controlled, a generator connected to supply current to the motor, a pair of opposed field windings for controlling the excitation of the generator, a pair of resistors each of which is disposed to be adjustably connected in circuit relation with one of the field windings, means disposed for operation to inversely vary the resistance of the pair of resistors connected in their respective field winding circuits, a member disposed for movement in response to operating conditions of the motor to effect the operation of the inversely varying means, and means responsive to directional movement of said member disposed for effecting quick initial changes in the excitation of the generator.

10. In a regulating system, in combination, a motor the speed and direction of operation of which is to be controlled, a generator connected to supply current to the motor, a pair of opposed field windings for controlling the excitation of the generator, a pair of resistors each of which is disposed to be adjustably connected in circuit relation with one of the field windings, means disposed for operation for inversely connecting the pair of resistors in their respective field winding circuits, a member disposed for movement in response to operating conditions of the motor to effect the operation of the connecting means, and means responsive to directional movement of said member disposed for effecting quick initial changes in the excitation of the generator, the quick change means being disposed to maintain the initial changes in the excitation until the directional movement is stopped.

11. In a regulating system, in combination, a motor the speed and direction of operation of which is to be controlled, a generator connected to supply current to the motor, a pair of opposed field windings for controlling the excitation of the generator, a pair of resistor circuits each of which is connected in circuit relation with one of the field windings, means disposed for operation to inversely vary the resistance of the pair of resistance circuits, a member disposed for movement in response to operating conditions of the motor to effect operation of the inversely varying means, and means responsive to directional movement of said member disposed for selectively effecting quick initial changes in the resistance of the resistor circuits to change the excitation of the generator.

12. In a regulating system, in combination, a motor the speed and direction of operation of which is to be controlled, a generator connected to supply current to the motor, a pair of opposed field windings for controlling the excitation of the generator, a pair of resistor circuits each of which is connected in circuit relation with one of the field windings, means disposed for operation to inversely vary the resistance of the pair of resistance circuits, a member disposed for rotational movement in response to operating conditions of the motor, means responsive to positional movement of the rotatable member for effecting the operation of the inversely varying means, and means responsive to directional movement of the rotatable member disposed for selectively effecting quick initial changes in the resistance of the resistor circuits to effect quick initial changes in the excitation of the generator, the quick change means being disposed to maintain the initial change in the selected field circuit for the duration of the directional movement.

STANLEY J. MIKINA.